Patented Dec. 9, 1924.

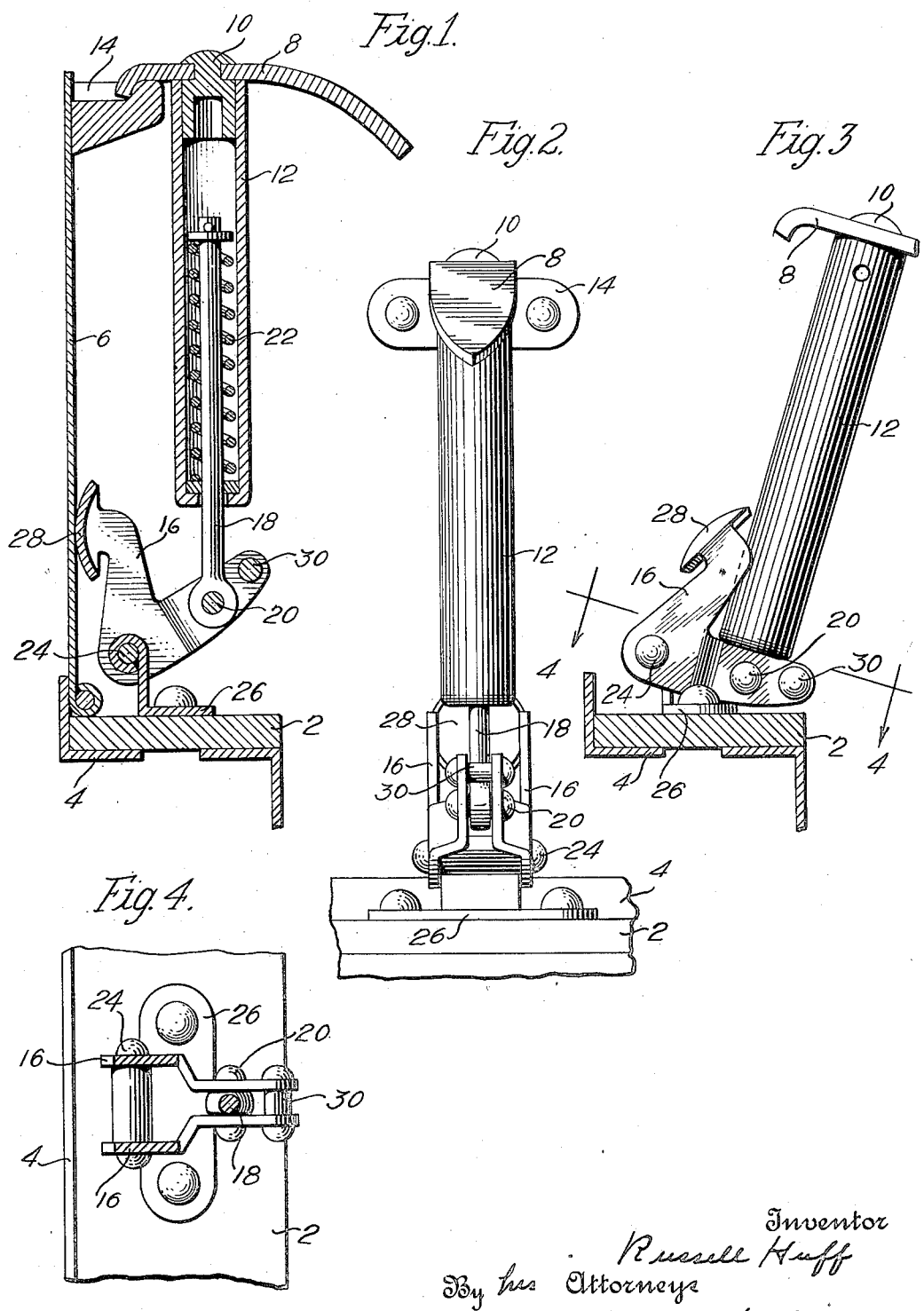

1,518,429

UNITED STATES PATENT OFFICE.

RUSSELL HUFF, OF DETROIT, MICHIGAN, ASSIGNOR TO DODGE BROTHERS, OF DETROIT, MICHIGAN, A CORPORATION OF MICHIGAN.

AUTOMOBILE HOOD-CLAMPING DEVICE.

Application filed December 20, 1921. Serial No. 523,608.

*To all whom it may concern:*

Be it known that I, RUSSELL HUFF, a citizen of the United States, residing at Detroit, Michigan, have invented certain new and useful Improvements in Automobile Hood-Clamping Devices, of which the following is a clear, full, and exact description.

This invention relates to devices for clamping the sides of a hood of an automobile in closed positions, and the principal object of the invention is to improve the construction and mode of operation of such devices.

The invention is designed primarily as an improvement on an automobile hood clamping device of the type illustrated and described in the patent to Kerr and Pray, No. 1,312,078, dated August 5, 1919. In clamping devices of this type the lever which carries the side clamp is free to move about its pivot when the hold-down clamp is out of operation and is liable to get in the way of the side of the hood when the latter is being closed. For this reason, before closing the hood, it is necessary for the operator to take hold of the hood clamp and place the same carefully in the proper position so that the lever will not obstruct the closing of the side of the hood. To avoid this difficulty, in accordance with the present invention, means is provided for causing the side clamp to be held out of hood obstructing position while the clamping device is out of operation. The parts of the clamping device are preferably constructed and arranged so that the side clamp is held out of hood obstructing position by the action of gravity on certain of the parts. In the preferred form of the invention, a connection between the hold-down clamp and the side clamp is provided for causing the side clamp to be moved out of hood-obstructing position by the movement of the hold-down clamp as the latter is released from clamping engagement with the hood and for holding the side clamp out of hood obstructing position while the clamping device remains out of operation. The particular construction in which these and other features are embodied in the present form of the invention is extremely simple and adds very little to the cost of manufacture of the hood clamping device.

The invention will be readily understood from the accompanying drawings illustrating a device embodying the invention in its preferred form and the following detailed description of the construction therein shown.

In the drawings—

Figure 1 is a view in vertical section of a hood clamping device embodying the invention illustrating the parts thereof in operating positions;

Fig. 2 is a view in side elevation of said device;

Fig. 3 is a view in front elevation illustrating the parts in unclamping or inoperative positions; and Fig. 4 is a sectional view taken substantially on the line 4—4 of Fig. 3.

In the construction illustrated in the drawing, reference numeral 2 indicates a portion of the frame of an automobile extending along the side thereof and 4 an angle plate secured to the frame part 2, the vertically extending portion of which plate projects above the frame part 2 and forms an abutment for the lower edge of the side of the hood. 6 indicates the usual side portion of the hood of an automobile which is pivoted at its upper edge to one of the upper sections of the hood to swing laterally of the automobile and is movable vertically by reason of the pivoting of said upper section in the usual manner.

The hood clamping device comprises a hold-down clamp for holding the side member 6 of the hood down in its lowermost position and a side clamp for holding the side portion 6 of the hood inwardly against the stop formed by the angle plate 4, these parts having the same general construction and mode of operation as the corresponding parts of the clamping device illustrated and described in the Kerr and Pray patent. The hold-down clamp comprises a clamping plate 8 which is secured to a stud 10 rigidly mounted in the upper end of a sleeve 12, the inner end of the plate 8 being formed into a hook for engagement with a suitably formed lug 14 secured to the portion 6 of the hood. The sleeve 12 is pivotally connected with a supporting lever 16 by means of a rod 18 pivoted at 20 to the lever and passing through the lower end of the sleeve into the central bore therein. The rod 18 is yieldingly connected with the sleeve by means of a spring 22 interposed between a collar secured to the upper end of the rod and a washer at the lower end of the sleeve through which the rod slides. The lever 16 is pivoted at 24 on a bracket 26 secured to the side member 2 of the automobile frame and carries a side clamping member 28 arranged to engage the outer face of the side member 6 of the automobile hood adjacent the lower edge thereof as shown in Fig. 1.

In order to cause the side clamp to be moved out of hood-obstructing position by movement of the hold-down clamp as the latter clamp is released from clamping engagement with the hood and to hold the side clamp out of hood-obstructing position while the clamping device remains out of operation, the lower end of the sleeve 12 is extended so that when the spring 22 expands, said sleeve will be forced against the lever 16 which embraces the rod 18, as clearly shown in Figs. 2 and 4. Furthermore, the lower face of the end of the sleeve and the upper edges of the portions of the lever 16 engaged thereby are constructed so that when the end of the sleeve engages the lever, the sleeve and the lever will be held from relative turning movement about the pivot 20. In the illustrated construction the lower end of the sleeve conforms to a plane substantially perpendicular to the axis of the sleeve.

The sleeve 12 and the lever 16 are preferably constructed as to give quite an extended bearing of the lower end of the sleeve against the lever. In the construction shown, the lever is extended beyond the sleeve and a pin 30 is passed through and secured in the two parts of the lever between which the rod 18 is located upon the outer side of said rod. This pin prevents the rod 18 from being swung outwardly about the pivot 20 far enough to carry the sleeve 12 to the under side of the arm of the lever 16 upon which said rod is pivoted.

With the above construction, when the hold-down clamp is lifted, placing the spring 22 under tension, and the inner end of the clamping plate is hooked over the lug 14, the side clamp 28 will be held yieldingly by the spring against the outer face of the part 6 of the hood, thereby forcing this part of the hood against the angle plate 4, and the spring will also tend to force the hold-down clamp downwardly, thereby holding the part 6 of the hood yieldingly in its downward position. When the hold-down clamp is released from the lug 4 and the sleeve 12 is allowed to be forced downwardly by the spring 22, as the operator relieves the lifting force on the clamp, the lower end of the sleeve is engaged with the lever 16, as shown in Fig. 3, and pressed firmly against the lever, so that the sleeve and lever will then be caused to move as a unit about the pivot 24. The axis of the lever 16 is located so that it lies within the hold-down clamp when the latter clamp is in clamping position, so that when the hold-down clamp is released from the hood it tends to fall outwardly and to carry the lever 16 therewith into the position shown in Fig. 3. When the hood clamp is wholly released, the sleeve 12 and the lever 16 will be held together in the relative positions shown in Fig. 3 and the lever will be held in a reliable manner by the weight of the parts in the position shown in this figure, with the side clamp 28 at a considerable distance from the side of the hood. The parts of the hood clamping device are thus held in positions such that they do not interfere in the slightest degree with the opening and closing of the side member of the hood when the clamping device is out of operation, and no careful and accurate placing of the clamping device is required upon releasing the same from the hood.

It is to be understood that the invention is not limited to the particular construction and arrangement of parts of the illustrated embodiment of the invention, but that certain features of the invention may be embodied in other forms within the scope of the claims.

Having explained the nature and object of the invention and having specifically described a device embodying the invention in its preferred form, what is claimed is:

1. An automobile hood clamping device having, in combination, a hold-down clamp, relatively slidable members upon one of which the hold-down clamp is mounted, a side clamp, a non-slidable pivotal connection between the other of said members and the side clamp, a spring acting in opposite directions on said members to maintain the clamps in clamping engagement with the hood, and a stop for limiting the pivotal movement of the latter member with relation to the side clamp so that the side clamp will be held out of hood-obstructing position by the weight of the side clamp and associated parts when the clamping device is out of operation.

2. An automobile hood clamping device having, in combination, a hold-down clamp, relatively slidable members upon one of which the hold-down clamp is mounted, a side clamp, a non-slidable pivotal connection between the other of said members and the side clamp, a spring acting in opposite directions on said members to maintain the clamps in clamping engagement with the hood, and a stop brought into operation by the action of said spring for limiting the pivotal movement of the latter member with relation to the side clamp so that the side clamp will be held out of hood-obstructing position by the weight of the side clamp and associated parts when the clamping device is out of operation.

3. An automobile hood-clamping device having, in combination, a hold-down clamp, a side clamp movable relatively to said hold-down clamp toward and from the hood, an operative connection between the hold-down clamp and side clamp comprising a spring arranged to maintain the clamps in clamping engagement with the hood, and means for causing the side clamp to move as a unit with the hold-down clamp out of hood-obstructing position as the latter clamp is released from clamping engagement with the hood and moved away from the hood, and for causing the side clamp to be held in position by the hold-down clamp when the clamping device is out of operation.

4. An automobile hood-clamping device having, in combination, a hold-down clamp, a side clamp movable relatively to said hold-down clamp toward and from the hood, an operative connection between the hold-down clamp and side clamp comprising a spring arranged to maintain the clamps in clamping engagement with the hood, and a connection between said clamps for holding the side clamp substantially in fixed relation to the hold-down clamp when the former clamp is released from clamping engagement with the hood, and means for movably supporting said clamps so that the side clamp will be held by gravity out of hood-obstructing position.

5. An automobile hood clamping-device having, in combination, a hold-down clamp, a side clamp movable relatively to said hold-down clamp toward and from the hood, an operative connection between the hold-down clamp and side clamp comprising a spring arranged to maintain the clamps in clamping engagement with the hood, and a connection between said clamps for holding the side clamp substantially in fixed relation to the hold-down clamp when the former clamp is released from clamping engagement with the hood.

6. An automobile hood-clamping device having, in combination, a side clamp lever, a side clamp carried by the lever, a hold-down clamp pivotally connected with the lever, a spring tending to force the hold-down clamp toward the lever, and means for connecting the hold-down clamp and the lever for movement as a unit about the axis of the lever when the hood-clamping device is out of operation.

7. An automobile hood-clamping device having, in combination, a side clamp lever, a side clamp carried by the lever, a hold-down clamp pivotally connected with the lever, a spring tending to force the hold-down clamp toward the lever, and means brought into operation by the action of the spring for connecting the hold-down clamp and the lever for movement together about the axis of the lever when the hood-clamping device is out of operation.

8. An automobile hood-clamping device having, in combination, a hold-down clamp comprising a sleeve, a hold-down hook carried by the sleeve, a lever, a side clamp carried by the lever, a rod pivotally connected with the lever and arranged to slide within the sleeve, and a spring interposed between an abutment of the rod and the sleeve and arranged to force the sleeve against the lever and thereby cause the lever and sleeve to move together about the pivot of the lever when the clamping device is out of operation.

Signed at Detroit, Mich., this 16th day of December, 1921.

RUSSELL HUFF.

Witnesses:
  WM. E. SHOEMAKER,
  ALFRED H. KNIGHT.